UNITED STATES PATENT OFFICE.

ALBRECHT SCHMIDT AND KARL THIESS, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

THIOINDIGO VAT DYE.

955,699.  Specification of Letters Patent.  Patented Apr. 19, 1910.

No Drawing.  Application filed January 11, 1910.  Serial No. 537,497.

*To all whom it may concern:*

Be it known that we, ALBRECHT SCHMIDT, Ph. D., chemist, and KARL THIESS, Ph. D., chemist, citizens of the Empire of Germany, residing at Höchst-on-the-Main, Germany, have invented certain new and useful Improvements in the Manufacture of New Vat Dyestuffs, of which the following is a specification.

We have found that the polyhalogen-thioindigoes, which can be obtained for instance by treating thioindigo-dyestuffs with an excess of bromin or with bromin in presence of chlorosulfonic acid, are capable, when heated with primary bases or ammonia, preferably with the addition of substances which facilitate the substitution of the halogen, for instance, in the anthraquinone series, copper, acetate of soda or the like, of partly replacing the halogen, particularly bromin, and thus forming new nitrogenous vat-dyestuffs.

Example I. 20 parts of pentabrom-thioindigo or a tetrabrom-thioindigo, such for instance as are produced by brominating thioindigo in presence of chlorosulfonic acid or by brominating with liquid bromin, are heated for about 5 hours to about 120° with about 150 parts of an ammonia solution of 30% strength while adding half a part of copper-powder, with or without the addition of some sodium acetate. After filtering and washing with water, the product is a bluish-violet powder which dyes cotton and wool violet tints of great fastness. The product thus obtained contains less bromin than the parent material and analysis shows that nitrogen has entered it. By heating to a higher temperature, products of a still bluer tint are obtained.

Example II. 20 parts of penta or tetra-brom-thioindigo are heated for some hours to about 150° C. or for a short time to boiling temperature with 60 parts of para-toluidin or anilin, with or without the addition of a solvent, such for instance as nitrobenzene, during which operation it is advantageous to add one of the agents known for facilitating the replacement of a halogen by an amin, such for instance as sodium acetate and copper-powder. The dyestuff obtained after removing the excess of amin is in the form of a violet-blue powder which dyes, in the hydrosulfite-vat cotton and wool violet-blue to blue tints. The more energetic the action of the amin has been, the deeper blue the tint will be.

Example III. 69 parts of pentabrom-thioindigo containing about 57% of bromin, 15 parts of para-phenylenediamin and 12-15 parts of sodium acetate are introduced, while stirring, into 690 parts of nitrobenzene and the mixture is heated for two hours to 160-170° C. (oil-bath temperature) while stirring until the solution assumes a blue color. After removing the nitrobenzene by passing steam through it, the product is in the form of a blue powder which dyes cotton and wool fast blue tints.

Example IV. 69 parts of pentabrom-thioindigo, 20 parts of alpha-naphthylamin, 16-18 parts of sodium acetate and half a part of copper-powder are introduced into 690 parts of naphthalene and the mixture is heated for about 2 hours to ebullition. After removing the naphthalene by passing steam through it, the product is a violet powder which dyes cotton and wool violet tints of great fastness.

Instead of the aforesaid amins, other amins such for instance as monoethylamin, benzylamin, para-chloranilin, para-anisidin, para-aminodiphenylamin, benzidin or the like may be used. In like manner, other polyhalogen-thioindigoes, such for instance as brominated dichloro- or tetrachloro-thioindigoes, brominated dichloro-dimethyl-thioindigoes or the like may be used in lieu of the polybrom-thioindigo.

The new dyestuffs are violet, violet-blue or blue powders, are soluble in concentrated sulfuric acid and hot nitro-benzene with a bluish-violet to blue color, and are almost insoluble in alcohol, benzene and carbon tetrachlorid.

Having now particularly described our invention, what we claim is:

1. The process of manufacturing nitrogenous vat-dyestuffs of the thioindigo-series, which consists in heating polyhalogen-thioindigoes with amins of the general formula R NH₂, wherein R means H, aryl, or alkyl, substantially as described.

2. As new products, the herein-described nitrogenous vat-dyestuffs of the thioindigo series, obtainable by heating polyhalogen thioindigoes with amins of the general formula R NH₂, wherein R means H, aryl, or alkyl; being bluish-violet to blue powders, soluble in concentrated sulfuric acid and hot nitrobenzene with a bluish-violet to blue color, almost insoluble in alcohol, benzene, carbon-tetrachlorid, and dyeing cotton and wool in the hydrosulfite vat violet-blue to blue tints of great fastness.

3. As a new product, the vat dyestuff obtainable by heating pentabrom-thioindigo and anilin, being a blue powder, soluble in concentrated sulfuric acid and hot nitrobenzene with a bluish-violet to blue color, almost insoluble in alcohol, benzene and carbon-tetrachlorid, and dyeing cotton and wool in the hydrosulfite vat violet blue tints of great fastness.

In testimony whereof, we affix our signatures in presence of two witnesses.

ALBRECHT SCHMIDT.
KARL THIESS.

Witnesses:
 JEAN GRUND,
 CARL GRUND.